US009049489B2

(12) United States Patent
Corl

(10) Patent No.: US 9,049,489 B2
(45) Date of Patent: *Jun. 2, 2015

(54) DIFFERENTIATED PSIP TABLE UPDATE INTERVAL TECHNOLOGY

(71) Applicant: LG Electronics Inc., Seoul (KR)

(72) Inventor: Mark T. Corl, Princeton, NJ (US)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/596,635

(22) Filed: Jan. 14, 2015

(65) Prior Publication Data
US 2015/0128188 A1 May 7, 2015

Related U.S. Application Data

(63) Continuation of application No. 14/478,615, filed on Sep. 5, 2014, now Pat. No. 9,015,766, which is a continuation of application No. 14/282,280, filed on May 20, 2014, now Pat. No. 8,955,018, which is a continuation of application No. 14/090,385, filed on Nov. 26, 2013, now Pat. No. 8,776,131, which is a continuation of application No. 13/940,992, filed on (Continued)

(51) Int. Cl.
H04N 5/445 (2011.01)
G06F 3/00 (2006.01)
G06F 13/00 (2006.01)
H04N 21/482 (2011.01)
H04N 21/435 (2011.01)
H04N 21/235 (2011.01)

(52) U.S. Cl.
CPC .......... H04N 21/482 (2013.01); H04N 21/435 (2013.01); H04N 21/2353 (2013.01)

(58) Field of Classification Search
CPC .................................... H04N 21/2353
USPC ..................................... 725/50, 54
See application file for complete search history.

(56) References Cited

U.S. PATENT DOCUMENTS

| 5,077,828 | A | 12/1991 | Waldroup |
| 6,137,549 | A | 10/2000 | Rasson et al. |
| 6,313,886 | B1 | 11/2001 | Sugiyama |
| 6,314,571 | B1 | 11/2001 | Ogawa et al. |
| 6,505,347 | B1 | 1/2003 | Kaneko et al. |
| 6,658,661 | B1 | 12/2003 | Arsenault et al. |

OTHER PUBLICATIONS

McKinney, et al. Program Guide for Digital Television ATSC Standard Doc.A/55. Jan. 3, 1996.
Program and System Information Protocol for Terrestrial Broadcast and Cable, Doc. A/65, Dec. 23, 1997.

*Primary Examiner* — Domonic D Saltarelli
(74) *Attorney, Agent, or Firm* — McKenna Long & Aldridge LLP

(57) ABSTRACT

An apparatus, method and data structure for generating at least one table in a broadcast environment, are provided. The apparatus includes a generator to generate an event information table (EIT) and an extended text table (ETT). The ETT has program guide information for an n-hour span and has a transmission interval. The ETT has a transmission interval and program description information according to the EIT. The transmission interval of the EIT is shorter than the transmission interval of the ETT.

8 Claims, 2 Drawing Sheets

Related U.S. Application Data

Jul. 12, 2013, now Pat. No. 8,782,708, which is a continuation of application No. 13/837,094, filed on Mar. 15, 2013, now abandoned, which is a continuation of application No. 13/614,306, filed on Sep. 13, 2012, now Pat. No. 8,443,391, which is a continuation of application No. 13/099,856, filed on May 3, 2011, now Pat. No. 8,347,335, which is a continuation of application No. 12/776,063, filed on May 7, 2010, now Pat. No. 7,962,939, which is a continuation of application No. 12/222,588, filed on Aug. 12, 2008, now Pat. No. 7,761,895, which is a continuation of application No. 11/075,928, filed on Mar. 10, 2005, now Pat. No. 7,426,742, which is a continuation of application No. 09/828,865, filed on Apr. 10, 2001, now Pat. No. 7,424,729.

(60) Provisional application No. 60/197,677, filed on Apr. 17, 2000.

DIFFERENTIATED PSIP TABLE UPDATE INTERVAL TECHNOLOGY

CONTINUITY DATA

This application is a continuation of application Ser. No. 14/478,615 filed Sep. 5, 2014, which is a continuation of application Ser. No. 14/282,280 filed May 20, 2014 which is a continuation of application Ser. No. 14/090,385 filed Nov. 26, 2013, (now issued as U.S. Pat. No. 8,776,131); which is a continuation of application Ser. No. 13/940,992 filed Jul. 12, 2013, (now issued as U.S. Pat. No. 8,782,708); which is a continuation of Ser. No. 13/837,094 filed Mar. 15, 2013 (now abandoned); which is a continuation of Ser. No. 13/614,306 filed Sep. 13, 2012 (now issued as U.S. Pat. No. 8,443,391); which is a continuation of Ser. No. 13/099,856 filed on May 3, 2011 (now issued as U.S. Pat. No. 8,347,335); which is a continuation of application Ser. No. 12/776,063 filed on May 7, 2010 (now issued as U.S. Pat. No. 7,962,939); which is a continuation of application Ser. No. 12/222,588 filed on Aug. 12, 2008 (now issued as U.S. Pat. No. 7,761,895); which is a continuation of application Ser. No. 11/075,928 filed on Mar. 10, 2005 (now issued as U.S. Pat. No. 7,426,742), which is a continuation of application Ser. No. 09/828,865 filed on Apr. 10, 2001 (now issued as U.S. Pat. No. 7,424,729); which claims the benefit of provisional application No. 60/197,677 filed on Apr. 17, 2000, all the applications which are incorporated herein by reference in its entirety.

FIELD OF THE INVENTION

The invention is directed toward the field of digital television signal meta data generation, and more particularly to the non-uniform issuance of certain tables included within such meta data.

BACKGROUND OF THE INVENTION

It is known for a digital television (DTV) signal to include meta data representing information about the contents of the events, e.g., programs, movies, sports games, etc. contained in the DTV signal. For a terrestrially broadcast DTV signal, the Advanced Television Standards Committee (ATSC) has promulgated the A/65 Standard that defines such meta data. The A/65 standard refers to such meta data as program and system information protocol (PSIP) data.

The PSIP type of meta data is issued periodically. Data of greater importance in the meta data hierarchy is inserted into the DTV signal more frequently than data of lower importance.

In general, in this art it is desired to maximize the amount of available bandwidth that can be allocated to the transmission of the DTV program content. Unfortunately, meta data consumes bandwidth that otherwise could be used to transmit the corresponding DTV program content. But such meta data is a prerequisite to an A/65 compliant DTV signal, hence it cannot be eliminated to recover bandwidth.

It is a problem to reconcile the contradictory design criteria of maximizing bandwidth allocated to DTV program content and providing sufficient meta data to ensure compliance with the A/65 standard.

SUMMARY OF THE INVENTION

The invention is, in part, a solution to the problem of how to insert the least amount possible of meta data into the DTV signal and yet still achieve an A/65 compliant DTV signal. In other words, the invention is, in part, a recognition that it is desirable to insert meta data into the DTV signal as infrequently as possible.

The invention is, also in part, a recognition that: the A/65 standard establishes fixed frequencies of table output for some of the program and system information protocol (PSIP) data tables, e.g., such as the Master Guide Table (MGT), the Virtual Channel Table (VCT) and the System Time Table (STT), but not for some others; and such unfixed output intervals afford opportunities to lessen meta data output thereby reducing bandwidth consumption in the form of PSIP meta data without sacrificing compliance with the A/65 standard.

The invention provides, in part, a method to determine issuance intervals for like types of tables, respectively, in a digital television packet stream having a plurality of different types of tables that do not have issuance intervals set by a governing standard. Such a method comprises: setting issuance intervals for like ones of the non-governed tables, respectively, to be non-uniform. Such non-uniform issuance intervals can be determined as a function of at least one of an amount of time in the future to which the table corresponds and a degree of probable interest to a viewer. Further, such non-uniform issuance intervals can be weighted so that an issuance interval for a table corresponding to a time nearer the present is smaller than an issuance interval corresponding to a time further in the future.

Examples of meta data PSIP tables that can benefit from the method according to the invention include extended text tables (ETTs) and event information tables (EITs).

Each issuance interval between any two instances of an $i^{th}$ table can be determined according to the following equation:

$$\text{interval}(i^{th}\text{ table}) = \text{root\_time} + (\text{increment\_time}) * i$$

where interval($i^{th}$ table) is the interval between any two instances of the $i^{th}$ table, root_time is a predetermined interval for the table corresponding most closely in time to the present, increment_time is a non-zero scalar and i is a non-zero integer.

The invention, also in part, provides a program and system information protocol (PSIP) generator to generate tables for a digital television system packet stream, the generator comprising: an interface to receive at least one issuance parameter for like tables that do not all have an issue interval assigned by a governing standard; and a non-uniform interval calculation unit to determine non-uniform issuance intervals for unassigned-interval-ones of said like tables based upon said at least one issuance parameter. Such a PSIP generator embodies the method according to the invention, e.g., as described herein.

The invention, also in part, provides a processor-readable article of manufacture having embodied thereon software comprising a plurality of code segments to cause a processor to perform the method according to the invention.

According to an aspect of the invention, there is provided an apparatus for generating at least one table in a broadcast environment, the apparatus comprising: a generator to generate an event information table (EIT) and an extended text table (ETT), the ETT having program guide information for an n-hour span and having a transmission interval, the ETT having a transmission interval and having program description information according to the EIT, wherein the transmission interval of the EIT is shorter than the transmission interval of the ETT.

According to an aspect of the invention, there is provided a method for generating at least one table in a broadcast environment, the method comprising: generating an event information table (EIT) and an extended text table (ETT), the ETT having program guide information for an n-hour span and having a transmission interval, the ETT having a transmission interval and having program description information according to the EIT, wherein the transmission interval of the EIT is shorter than the transmission interval of the ETT.

According to an aspect of the invention, there is provided a data structure for generating at least one table in a broadcast environment, the structure comprising: an event information table (EIT) having program guide information for an n-hour span and having a transmission interval; and an extended text table (ETT) having a transmission interval and having program description information according to the EIT, wherein the transmission interval of the EIT is shorter than the transmission interval of the ETT.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 1:
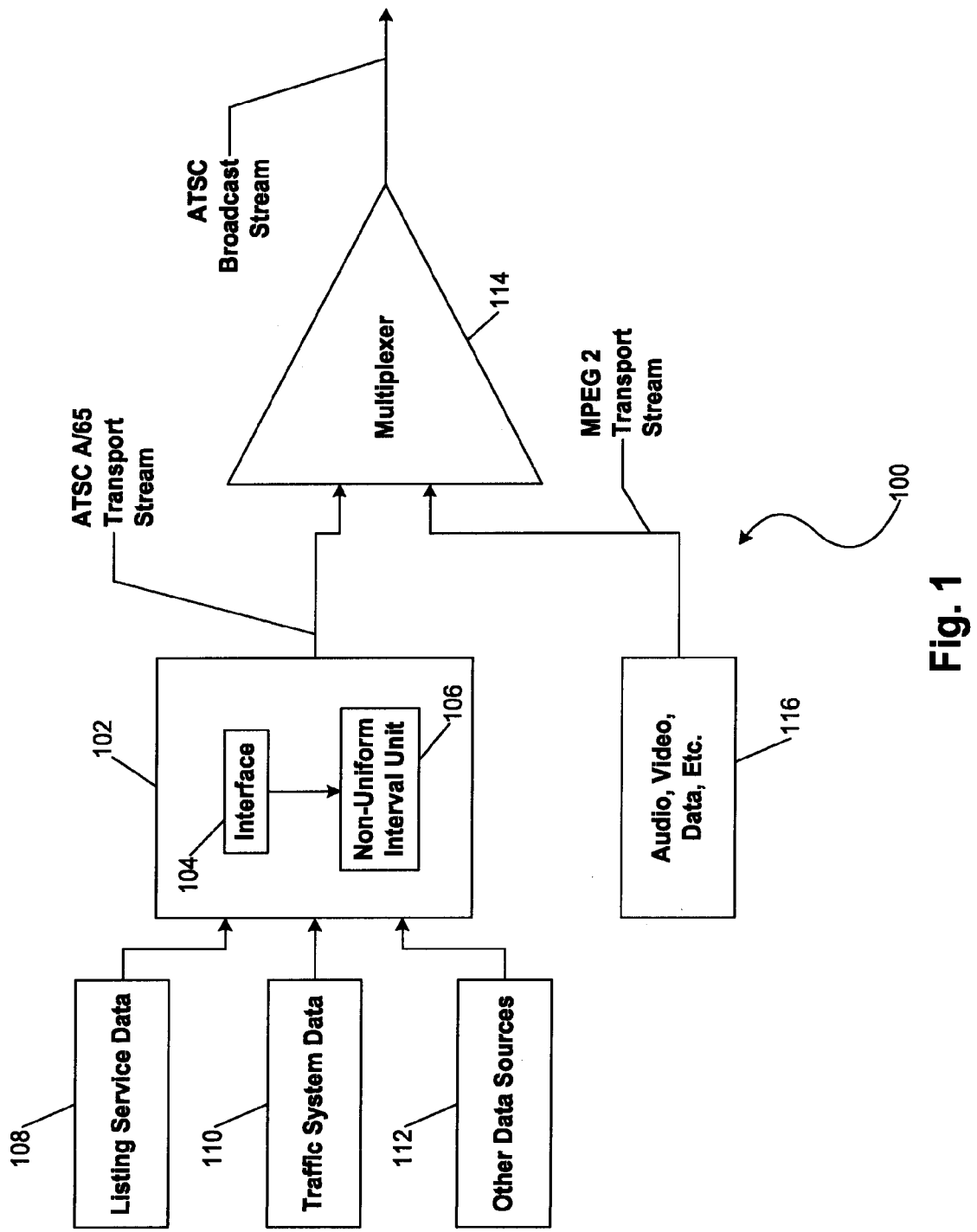
FIG. 1 is a block diagram of a PSIP generator according to the invention in the context of typical inputs to it and outputs from it.

FIG. 1 is a block diagram of a program and system information protocol (PSIP) data generator according to the invention in the context of system 100 that can produce an Advanced Television Standards Committee (ATSC), standard A/65, compliant digital television (DTV) signal. The system 100 of FIG. 1 includes: a PSIP generator 102 according to the invention; sources of data upon which the PSIP generator operates, such as a source 108 of listing service data, a source 110 of traffic system data and a source 112 of other data; a multiplexer 114 to incorporate the PSIP data from the PSIP generator 102 into an A/65-compliant DTV signal; and a source 116 of audio data, video data, etc.

In FIG. 1, the PSIP generator 102 includes an interface unit 104 and a non-uniform interval calculation unit 106.

The PSIP generator 102 according to the invention can be implemented by adapting a well known PSIP generator according to the discussion herein. An example of a known PSIP generator is the PSIP BUILDER PRO brand of PSIP generator manufactured and sold by TRIVENI DIGITAL INC. The PSIP BUILDER PRO itself is based upon a programmed PC having a Pentium type of processor using the MICROSOFT WINDOWS NT4.0 operating system. The software can be written in the Java language. The other blocks of FIG. 1 correspond to known technology.

In FIG. 1, the invention has been depicted in the context of a digital television broadcast such as a terrestrial broadcast, and more particularly one that is compliant with the Advanced Television Standards Committee (ATSC), where each event is a program, and the schedule data is PSIP data. However, the invention is readily applicable to any television format, e.g., analog terrestrial, analog cable, digital cable, satellite, etc., for which an electronic schedule is maintained and corresponding data is sent to a receiver for the purpose of presenting an electronic program guide (EPG) to a viewer.

The units 104 and 106 within the PSIP generator 102 do not necessarily correspond to discrete hardware units. Rather, the units 102 and 104 can represent functional units corresponding to program segments of the software that can embody the invention.

The interface unit 104 can generate a graphical user interface (GUI) that operates to receive at least one issuance parameter for like PSIP tables (e.g., ETTs or EITs) that do not all have an issue interval assigned by the A/65 standard. Such an interface will be described in more detail below with regard to FIG. 2. The non-uniform interval calculation unit 106 is operable to determine non-uniform issuance intervals for ones of the like PSIP tables that do not have an assigned interval, based upon the issuance parameter(s) received via the interface unit 104.

Figure 2:
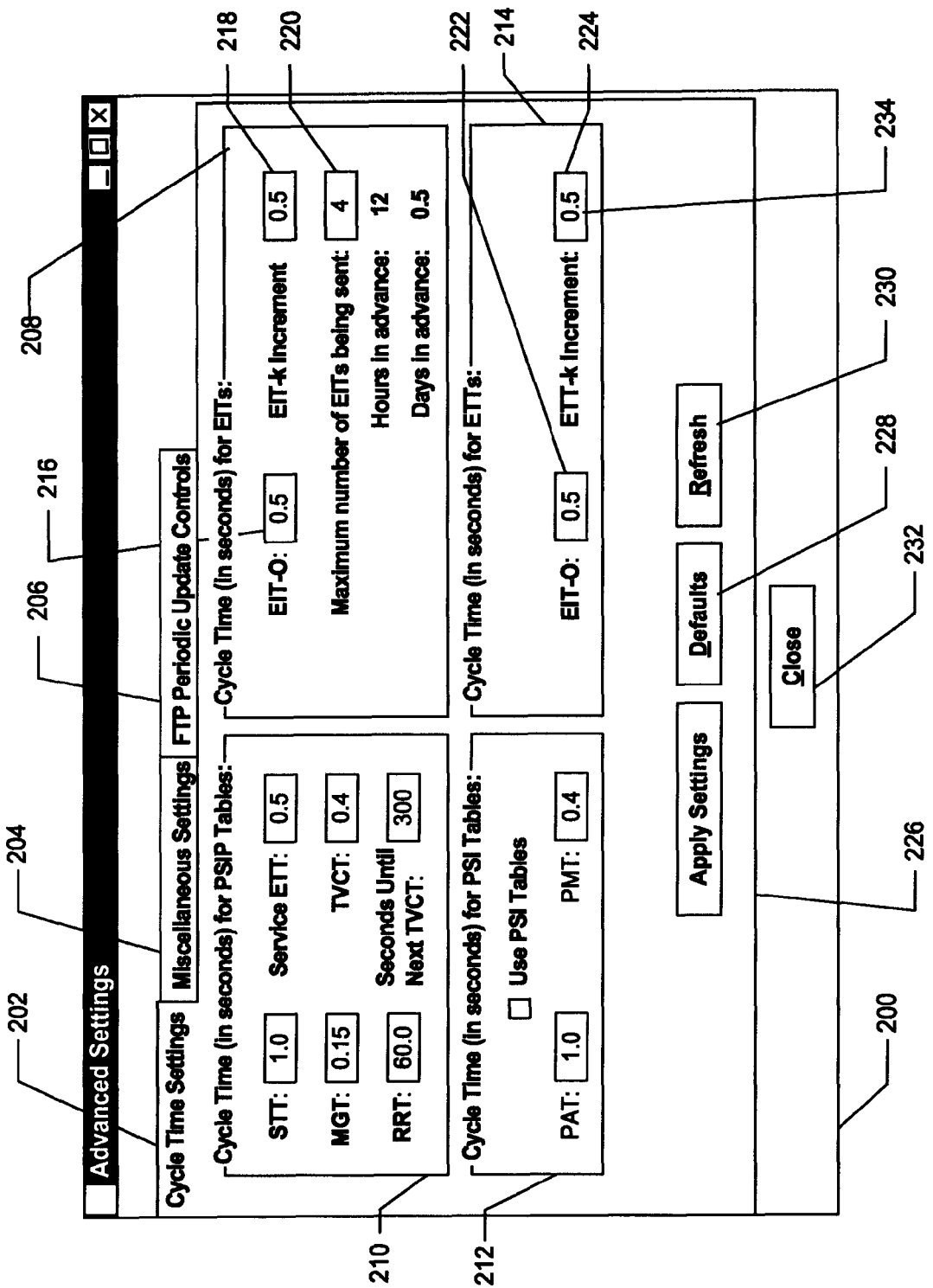
FIG. 2 is an image of a dialog window within a screen of a graphical user interface (GUI) generated by the PSIP data generator according to the invention.

FIG. 2 is an example image of a dialog window 200 (a GUI) that can be generated by the interface unit 104 according to the invention. In FIG. 2, the dialog window 200 can include: a Cycle Time Settings tab 202; a Miscellaneous Settings tab 204; a FTP Periodic Update Controls tab 206; an "Apply Settings" button 226; a "Defaults" button 228; a "Refresh" button 230; and a "Close" button 232. The position of the cursor can be indicated via the reverse highlighting 234. The Cycle Time Settings tab 202 can include a "Cycle Times (in seconds) for EITs:" region 208, a "Cycle Times (in seconds) for PSIP Tables:" region 210, a "Cycle Times (in seconds) for PSI Tables:" region 212 and a "Cycle Times (in seconds) for ETTs:" region 214.

It is well known that EITs carry program schedule information including program title information and program start information. Each EIT covers a three-hour time span. ETTs carry text messages associated with the EITs, e.g., program description information for an EIT.

In FIG. 2, the "Cycle Times (in seconds) for EITs:" region 208 of the dialog window 200 can include: a box 216 in which a user can enter a fixed interval for the $EIT_0$ table; a box 218 in which a user can enter an increment for the $EIT_k$ table; and a box 220 in which a user can enter a maximum number of EIT tables that are to be sent. Usually, the number entered in box 220 will be far smaller than the maximum number of EIT tables permitted by the A/65 standard.

Also, in FIG. 2, the "Cycle Times (in seconds) for ETTs:" region 214 can include: a box 222 in which a user can enter a fixed interval for the $ETT_0$ table; and a box 224 in which a user can enter an increment for the $ETT_k$ table.

The non-uniform interval calculation unit 106 can receive the values in the boxes 216, 218, 220, 222 and 224 from the regions 208 and 214, respectively, and use them to determine the non-uniform issuance intervals of, e.g., the EIT and ETT tables. Further discussion of the operation of the unit 106 is couched in a particular non-limiting example, for simplicity.

The A/65 standard recommends a time interval for outputting the zeroith Event Information Table (EIT), i.e., $EIT_0$, but provides no guidelines regarding $EIT_1$ through $EIT_{128}$. For the Rating Region Table (RRT), the A/65 standard recommends a value only for the output frequency of $RRT_1$. And no recommendation is made regarding the output frequencies of any of the Extended Text Tables (ETTs).

Under the A/65 standard, it is left to the discretion of the operator of a PSIP data generation system to select the frequency of table output for the unmentioned tables. The operator could specify an entry for each group of tables, but that would be burdensome because it would require a total of over 500 entries. A simple solution to the problem of unspecified output frequencies would be to set each type of table to the same output frequency, but that creates a problem in that the guidelines for bandwidth specified by the A/65 standard would be exceeded.

A further consideration to solve the problem, namely of how to insert the least amount possible of meta data into the DTV signal and yet still achieve an A/65 compliant DTV signal, is: How closely in time to the present moment does each table relate? That is, table types such as the EIT describe event information up to two weeks into the future. A user of an electronic program guide that receives such table types will typically want to view event information concerning only the next 24-48 hours. Users typically do not look farther into the future than this because (at least in part) the event schedule information two weeks into the future is much more likely to change than is event schedule information concerning the next 24-48 hours, i.e., the farther into the future, the less reliable the event information becomes.

Care must be exercised so as not to set the intervals to be too infrequent. This is because the DTV receiver can become stalled waiting for a table to arrive. If the DTV receiver is stalled for 0.5 seconds, a user might not notice or object if she did. But such a delay of, e.g., 4-5 seconds probably would be noticed by, and probably would annoy, the user. This reinforces the need to set short intervals for near term events because users are likely to want to display EPG information about them.

Again, the invention, in part, provides an interface unit 104 that defines parameters that the non-uniform interval calculation unit 106 then can use to generate the time intervals between tables of the same type. Typically (but not necessarily) the function performed by the unit 106 will be linear, e.g., with a defined start interval (the root_time) and an increment interval (increment_time). For example, if the user desires $EIT_0$ to be output every half second (root_time) with each succeeding $EIT_i$ to be output 0.25 seconds less frequently than the preceding EIT, namely $EIT_{i-1}$, the user would enter 0.5 seconds as the root_time in box 216 and 0.25 seconds as the increment_time in box 218. The function for each table EIT-i interval would then be:

Time between any two instances of $table_i$ = root_time + (increment_time * i)

= 0.5 sec + (0.25 sec * i)

For example, $EIT_{12}$ can be output every 0.5 sec+(0.25 sec*12)=3.5 seconds, which is less frequent than $EIT_0$. Obviously, other examples are possible, e.g., the increment_time for each of different groups of like tables can be set.

A similar calculation for ETTs can be performed by the unit 106.

The invention has at least the following advantages: 1) it provides an easy way of entering the interval times for the tables: 2) it defines the interval times for like tables that are not all fixed to a constant interval; and 3) it provides an interval function that increases the interval for tables that represent information further out in time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method to set repetition intervals for tables to be transmitted as part of a digital television (DTV) transport stream, the method comprising:

setting repetition intervals for a sequence of event information tables EIT0, EIT1, EIT2, and EIT3 containing program information covering different time spans, wherein the repetition interval of the EIT0 is less than the repetition interval of the EIT1;

setting repetition intervals for a sequence of extended text tables ETT0, ETT1, ETT2, and ETT3 containing program description information associated with the EIT0, EIT1, EIT2, and EIT3, respectively, wherein the repetition interval of the ETT3 is greater than a sum of the repetition interval of the EIT0 and the repetition interval of the EIT1;

wherein the repetition interval of the ETT2 is equal to the repetition interval of the EIT2, wherein the repetition interval of the ETT3 is equal to the repetition interval of the EIT3, and wherein the repetition interval of the ETT1 is equal to the repetition interval of the EIT2; and broadcasting the DTV transport stream having the EITs and the ETTs therein to receiving devices.

2. The method of claim 1, wherein each of the different time spans is a 3 hour time span.

3. The method of claim 1, wherein the program information includes program guide information having at least program duration time information and program start time information.

4. The method of claim 1, wherein the repetition intervals of the EIT0 is 0.5 seconds.

5. A method of processing a digital television (DTV) stream in a DTV receiver, the method comprising:

receiving in a DTV transport stream a sequence of event information tables EIT0, EIT1, EIT2, and EIT3 containing program information covering different time spans, wherein a repetition interval of the EIT0 is less than a repetition interval of the EIT1; and parsing at least one of the EIT0, EIT1, EIT2, and EIT3 from the DTV transport stream, wherein the DTV transport stream has a sequence of extended text tables ETT0, ETT1, ETT2, and ETT3 containing program description information associated with the EIT0, EIT1, EIT2, and EIT3, respectively, wherein a repetition interval of the ETT3 is greater than a sum of the repetition interval of the EIT0 and the repetition interval of the EIT1;

wherein the repetition interval of the ETT2 is equal to the repetition interval of the EIT2, wherein the repetition interval of the ETT3 is equal to the repetition interval of the EIT3, and wherein the repetition interval of the ETT1 is equal to the repetition interval of the EIT2.

6. The method of claim 5, wherein each of the different time spans is a 3 hour time span.

7. The method of claim 5, wherein the program information includes program guide information having at least program duration time information and program start time information.

8. The method of claim 5, wherein the repetition intervals of the EIT0 is 0.5 seconds.

* * * * *